United States Patent [19]
Hintze et al.

[11] Patent Number: 5,921,721
[45] Date of Patent: Jul. 13, 1999

[54] CUTTING INSERT

[75] Inventors: Wolfgang Hintze; Bernd Knickenberg, both of Essen, Germany

[73] Assignee: Widia GmbH, Essen, Germany

[21] Appl. No.: 08/809,665

[22] PCT Filed: Sep. 11, 1995

[86] PCT No.: PCT/DE95/01243

§ 371 Date: Mar. 11, 1997

§ 102(e) Date: Mar. 11, 1997

[87] PCT Pub. No.: WO96/08331

PCT Pub. Date: Mar. 21, 1996

[30]  Foreign Application Priority Data

Sep. 13, 1994 [DE] Germany ................................ 4434297
Oct. 21, 1994 [DE] Germany ................................ 4437689

[51] Int. Cl.⁶ .............................. B23B 15/28; B23B 1/00
[52] U.S. Cl. ........................................... 407/113; 407/114
[58] Field of Search ..................................... 407/113, 114

[56]  References Cited

U.S. PATENT DOCUMENTS

| | | | |
|---|---|---|---|
| 4,084,917 | 4/1978 | Stumpp | 407/114 |
| 4,359,300 | 11/1982 | Hazra et al. | 407/114 |
| 4,681,486 | 7/1987 | Hale | 407/114 |

FOREIGN PATENT DOCUMENTS

| | | |
|---|---|---|
| 0133168 | 2/1985 | European Pat. Off. |
| 0162029 | 11/1985 | European Pat. Off. |
| 0 313 534 A2 | 4/1988 | European Pat. Off. |
| WO 93/13899 | 7/1993 | European Pat. Off. |
| 0 596 844 A1 | 5/1994 | European Pat. Off. |
| 2 223 122 | 10/1974 | France. |
| 2550333 | 5/1977 | Germany. |
| 9215855 | 5/1994 | Germany. |
| 4134335 | 4/1998 | Germany. |
| 52-101786 | 8/1977 | Japan. |

*Primary Examiner*—Andrea L. Pitts
*Assistant Examiner*—Toan Le
*Attorney, Agent, or Firm*—Herbert Dubno

[57]  ABSTRACT

A cutting insert includes at least one cutting edge which is formed with at least one projection spaced apart from a cutting corner and at least one recess adjacent the projection.

28 Claims, 12 Drawing Sheets

CUTTING INSERT

CROSS REFERENCE TO RELATED APPLICATION

This is a national phase application of German P 44 34 297.7 filed Oct. 21, 1994 and based in turn, on PCT/DE95/01243 filed Sep. 11, 1995 under the International Convention.

FIELD OF THE INVENTION

The invention relates to a cutting insert with a generally rhombic, triangular, or trigonal shape with at least on acute-angle cutting edge which has a cutting-corner angle <90°.

BACKGROUND OF THE INVENTION

In shaping and smoothing the workpiece shape, in order to shorten machining time, to maintain the tightest position tolerance, and to simplify programming the workpiece shape is produced in one cut. To this end in the outward copying of plane workpiece shoulders there are problems with respect to controlling the chip, which problems are particularly troublesome in automatic operations.

German 2,550,333 describes a cutting insert for copy turning which has in addition to the main cutting edge an additional cutting part which extends generally perpendicular to the main cutting edge and away from the main cutting edge. This cutting part can be shaped like a convex circular arc. The disadvantage is that the blade is very difficult to control both during longitudinal as well as inward copying as well as with flat-shoulder turning in contact with the workpiece, in that the differences produced during material removal in the chip thickness make a desired chip monitoring and blade control difficult or impossible.

European 0,133,168 describes a cutting insert for cylindrical turning, inward turning, and transverse turning purposes which had cutting corners that run together at a cutting corner angle ≦90°, which during cylindrical turning and inward turning cuts into the workpiece. Along the cutting edges there is provided in addition a projecting cutting part that should serve as transverse cutter for removing coarse and short chips during the verse turning. The projecting part preceding the acute-angle cutting corner, simultaneously cuts chips from the workpiece. The preceding part of the cutting edge can be convexly curved and lie between two cutting corners or adjacent an obtuse-angle cutting corner. The disadvantage of these cutting inserts is that they cannot be clamped in a standardized holder (according to DIN or ISO standards). In addition the main cutting edge adjacent the acute-angle cutting corner is engaged during longitudinal and inward copying as well as during flat-shoulder turning so that the resulting differences in the chip thickness cannot be controlled or can only be badly controlled with respect to chip formation and cutting stability. In addition in roughing and smoothing of the plane workpiece shoulder there are considerable machining forces which vary considerably so that the turned workpiece surface does not meet tolerances and/or cannot be maintained smooth. With the forces that occur there is also the danger of overloading the cutting insert that can under some circumstances lead to breakage.

Japanese 52-101786 describes a basically triangular or four-cornered cutting insert whose cutting edges each have on one side of a cutting corner a projecting nose-like cutting-edge region whose overall envelope is congruent to the basic shape but is a flatter larger triangle or rectangle. In the region of the nose-like projection there are recesses along the cutting edges. This cutting insert because of its construction can only be used for machining in one direction, that is only for left- or right-hand turning operations since for each cutting corner only one of the adjacent cutting edges is usable. In addition the projecting regions prevent clamping of the cutting insert in the holder.

EP 0,162,029 describes a cutting insert for cylindrical turning, inward copy turning, grinding relief turning, and outward copy turning having cutting corners whose widths are extended and which are formed of a plurality of curved segments which are generally mirror symmetrical to the cutting-corner bisectors. The curvature of the blade arranged furthest from the middle of the cutting insert consists of a circle segment with a radius that is smaller than the radius of the adjacent cutting-edge segment. Even this cutting insert cannot be clamped in a standard cutting-insert holder because of the outwardly projecting cutting corners. The cutting corners are during longitudinal and inward copying as well as flat-shoulder turning in engagement so that as in the above-described cutting inserts there are different in the chip thicknesses which prevent adequate control of the chip and cutting stability.

OBJECTS OF THE INVENTION

It is an object of the present invention to provide a cutting insert for chip-forming machining which intended for turning under different attack conditions ensures during outward copying of plane workpiece shoulders a process-safe short-chip formation; A further object is to provide the insert which has good cutting stability in order at high advance speeds, to be used for inward and/or outward copying workpiece shapes makes it possible to producing an optimal quality of the surface finish of the workpiece with a good service life with and stil another object is to provide the insert that can be held in standard (according to DIN or ISO standards) holders and that on chip formation ensures good positioning even when positioned in different load directions.

SUMMARY OF THE INVENTION

This object is achieved by the cutting insert which according to the invention is characterized in that the acute-angle cutting corner(s) are set in from the basic shape envelope and merge at the end turned away from the cutting corner into a cutting protuberance whose outermost point lies on the envelope of the basic shape and after which in the cutting direction on the side turned away from the cutting corner there is at least one cutting recess.

As a result of this formation for inward, outward, and longitudinal on the one hand and outward copying of plane workpiece shoulders on the other different cutting sections are produced which separately (and in contrast to the prior-art solutions never jointly) can be used for chip-removal machining. In contrast to EP 0,133,168 and EP 0,162,029 the cutting insert according to the present invention has no cutting edge sections which extend past the standardized rhombic, triangular, or trigonal shape so that a mounting or clamping in the prior-art standardized cutting-insert holder is possible. In particular the cutting insert according to the invention has one or more set-in acute-angle cutting corners or one set-in main cutting edge adjacent an acute-angle cutting corner which comes into play on inward or outward or cylindrical turning for material-removing machining use. The cutting recess adjacent the cutting-corner flank adjacent the cutting protuberance creates a cutting region that serves exclusively for outward copying of plane workpiece shoulders. Rhombic, triangular, or trigonal cutting inserts, in particular D and T shapes are possible as envelope base shapes.

Preferably the cutting insert is made such that the common tangent of the cutting protuberance and a point of the recessed cutting edge or of the recessed part of the main cutting edge forms with the basic-shape envelope an acute angle $\leq 20°$, preferably $\leq 10°$. This angle, which is under special circumstances can for example be 3°, makes it possible for the acute-angle set-in cutting corner to be made such that the cutting-corner angle corresponds to the envelope base shape.

In addition on clamping of the cutting insert in a holder whose set angle is 90° plus an acute angle one is certain that a (right-angle) plane workpiece shoulder can be made.

According to a further feature of the invention the spacing between the tangential contact points determines the maximum main cutting length for inward and outward copying and cylindrical turning which is preferably greater than the cutting-corner radius. This determination is only apparently a limitation, since on finish machining or in producing near-net-shape workpieces only a limited amount is left that can determine the cutting length.

In a particular embodiment of the cutting insert the main cutting length for inward or outward copying and cylindrical turning has a length between 0.6 mm and 6 mm or has a length about 1.5 to 8 times, preferably 2.5 to 5 times, as large as the cutting-cor-ner radius of the adjacent acute-angle cutting corner.

According to another feature of the invention the blade has in the region of the cutting protuberance a convex shape a cutting radius which is preferably about equal to the cutting-corner radius of the adjacent acute-angle cutting corner.

The cutting portion between the acute-angle cutting corner and the cutting protuberance is at least partially concave, preferably consisting of concave and straight-line portions. in particular this cutting portion is made uniform, that is without corners and edges. The part of the cutting recess adjacent the cutting protuberance extends at an angle or at a tangential angle on the concave cutting edge between the base-shape envelope and the tangents to the blade between 5° and 35°, preferably 15° to 25°. The depth of the cutting recess lies between 0.2 mm and 6 mm, preferably 0.3 mm and 1.5 mm.

According to another feature of the invention the depth of the cutting recess (relative to the base-shape envelope) is smaller than the projection of the cutting-body lower edge relative to the engagement surface edge of the holder. This feature ensures a sure clamping of the cutting insert in the holder and protects the later from eventual damage by chips. The length of the cutting recesses is between 2 mm and 10 mm, preferably 3 mm to 6 mm. The cutting edge is recessed at the end of the cutting recess relative to the cutting protuberance, preferably by 0.3 mm to 2 mm, again preferably by 0.4 mm to 1 mm. Preferably the cutting-corner angle of the acute-angle cutting corners is equal to the cutting-corner angle of the base-shape envelope. In this manner cut requirements can be met that are equal to those of the state of the art of known cutting inserts which have the shape of the base-shape envelope.

In order to be able to make deeper cuts on outward copying of plane workpiece shoulders, a further feature of the invention provides that one or more further cutting recesses are provided adjacent the cutting recess and their end points lie on the base-shape envelope. In particular the cutting recess or the cutting portions at the ends of the cutting recesses are formed straight and lie on the base-shape envelope so as to ensure a sure an stable mounting in holders formed with the base-shape envelope shape. The mentioned straight cutting portions between cutting protuberances have according to another feature of the invention a length between 0.1 mm and 1 mm, preferably 0.1 mm and 0.5 mm.

Finally the set-in cutting corners or the set in part for inward or outward copying or cylindrical turning of a main cutting edge ending at an acute-angle cutting corner are so shaped relative to the cutting recess or recesses for outward copying of plane workpiece shoulders that the chip shape geometry produced by engaging or cutting a chip is different, in particular the chips produced on inward or outward copying or cylindrical turning have a greater chip thickness than the chips produced by outward copying of plane workpiece shoulders.

According to a further feature of the invention the basic shape has the tolerance (according to DIN or ISO standards) and/or the acute-angle cutting corner or corners have a dimension that varies from the normal tolerance by an amount of at most 1.5 mm, a preferably 0.3 mm.

The base-shape envelope varies in the inward-circle radius by an amount of at most 3 mm, preferably at most 0.5 mm, from the normal inner-circle radius according to DIN 4987 or ISO 1832 from similar larger or smaller cutting inserts. Preferably the base-shape envelope in the inner-circle radius is larger than the dimension determined by the tolerance M and/or that the dimension mL of the acute-angle cutting-corner(s) lies inside the tolerance dimension M according to DIN 4987 or ISO 1832.

In order to make possible an exact position of the cutting insert in standardized holders a further provision of the invention is that the central cutting-insert bore or clamp bore seen in top view is of an elongated or edge-free cloverleaf shape. The circle sections varying from the basic circular shape of the elongated or cloverleaf-shaped extensions and having circle centers offsets which correspond preferably to the quotient of the inner-circle radius difference and the sine of the half angle of the cutting-corner angle and shifted toward the acute-angle cutting corner. Alternately the enlarged cutting-insert bore is circular, preferably having a circle radius circumscribing the elongated or cloverleaf shape.

According to a further feature of the invention the cutting insert is used by clamping in a cutting-insert holder at an attack angle $\leq 90°$, preferably 95°, 93°, 91°, 100°, or 107.5°. Clamping the cutting insert in a holder whose attack angle is formed by 90° plus an acute angle ensures that a (right angle) plane workpiece shoulder can be produced.

According to a further feature of this invention the cutting insert is characterized by a rhombic or trigonal base shape, the cutting edges rising to the obtuse-angle corners at a negative angle. As a result of this feature, which comes from a corresponding height reduction in the region of the cutting edge between an acute- and an obtuse-angle cutting corner, the flat-shoulder cutting amount is increased. According to a preferred feature the angle is 15° to 45°.

The height measured from the cutting surface to the opposite cutting surface or base surface at the starting point of the first recess has a dimension and in the region of the first recess and/or of the second recess a smaller dimension that preferably lies between one tenth and half of this first-mentioned dimension. Preferably the smallest height in the region of the second recess is smaller than the height in the region of the first recess.

With only one recess per cutting edge according to a further feature of the invention there is adjacent it for outward copy turning a cutting edge dropping at a positive angle. This angle lies between 30° and 75°, preferably between 40° and 65°.

With only one recess per cutting edge the height of the cutting insert at the end remote from the recess $\leq$ the height of the cutting insert in the region between the obtuse-angle cutting corner and the mentioned end, this height being $\leq 1$ mm and/or lying between one tenth and half of the dimension of the height of the cutting insert that this has in the region of the acute-angle cutting corner.

BRIEF DESCRIPTION OF THE DRAWING

The above and other objects, features, and advantages will become more readily apparent from the following description, reference being made to the accompanying drawing in which.

SPECIFIC DESCRIPTION

The cutting insert shown in FIG. 1 has a generally rhombic shape that is only departed from in the region of the acute-angle cutting corners and in the below-described cutting recesses. The basic-shape envelope is shown at 10. The cutting insert has two opposite acute-angle cutting corners 11 which are set in relative to the base-shape envelope to an extent d. The cutting corner 11 with the radius $R_1$ merges with a cutting part 12 formed of straight and/or concavely shaped parts that lie between points $P_1$ and $P_2$. This cutting section defines together with the radius $R_1$ the maximum cutting depth $L_1$ for inward or outward copying or length turning. The cutting part 12 is followed by a cutting protuberance 13 with a radius $R_2$ which is generally the same as the mentioned radius $R_1$. Farther along the cutting edge is a cutting recess 14 with a depth x relative to the envelope basic shape 10. This cutting recess 14 is formed of concave and/or straight cutting parts and ends at a point $P_3$. A tangent T common to the cutting protuberance 18 and to the cutting part 12 is inclined by an angle $\phi$ preferably less than 10°, in particular 1° or 3°. The part of the cutting recess following the cutting protuberance 13 extends at an angle $\rho$ which lies between 15° and 25°. This part of the cutting recess 14 serves on the outward copying of plane workpiece shoulders as the effective cutter. The respective cutting depth can with shoulders up to a level of $L_2$–$L_1$ be a maximum of about the cutting-recess depth x. The cutting insert has an inner circle radius R (see FIG. 4) which corresponds to DIN standard 4987 or ISO standard 1832 with a tolerance M. The acute-angle cutting corner has a dimension m that is less than the normal tolerance M by an amount equal to at most 1.5 mm, preferably 0.3 mm.

Figure 2:
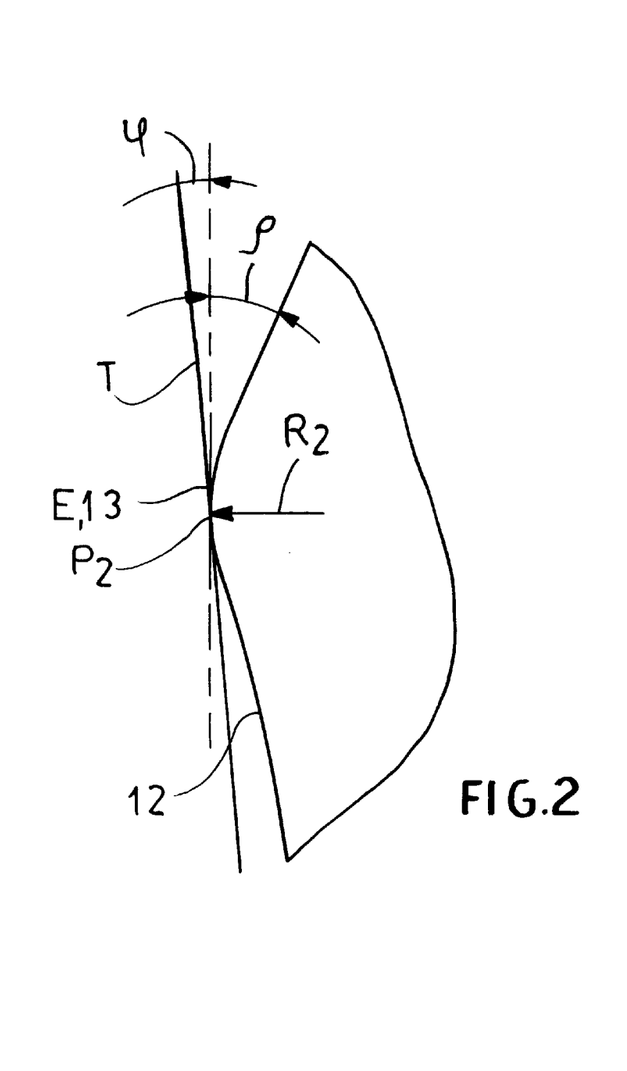
FIGS. 2 and 3 are detail views of the cutting protuberance in different embodiments.
Figure 3:
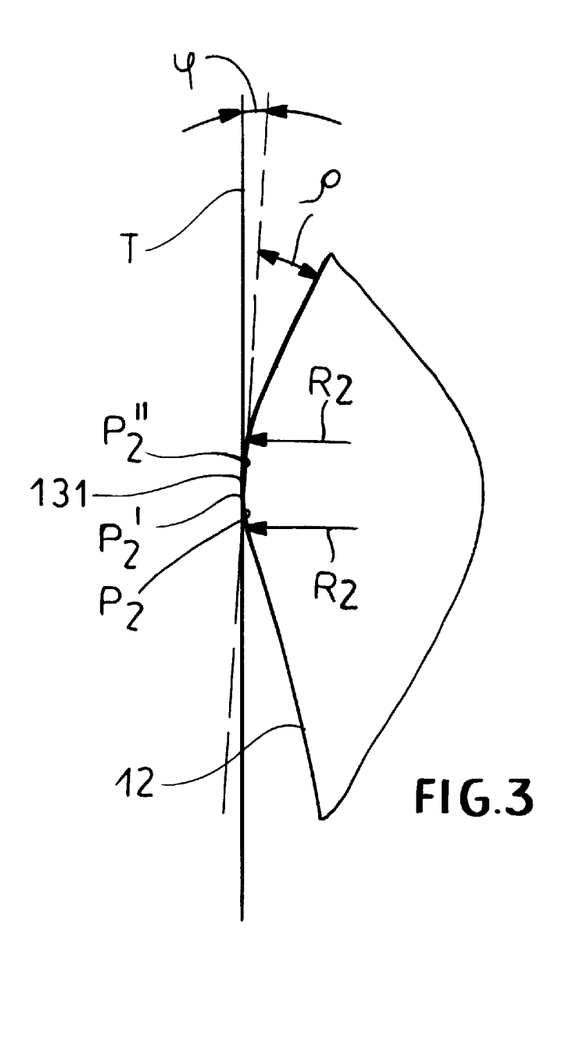

As can be seen in FIGS. 2 and 3 the cutting protuberance 13 has a constant radius $R_2$ (FIG. 2) or a straight cutting part 131 which connects the points $P_2$ and $P_{2''}$ with the radius $R_2$.

Figure 1:
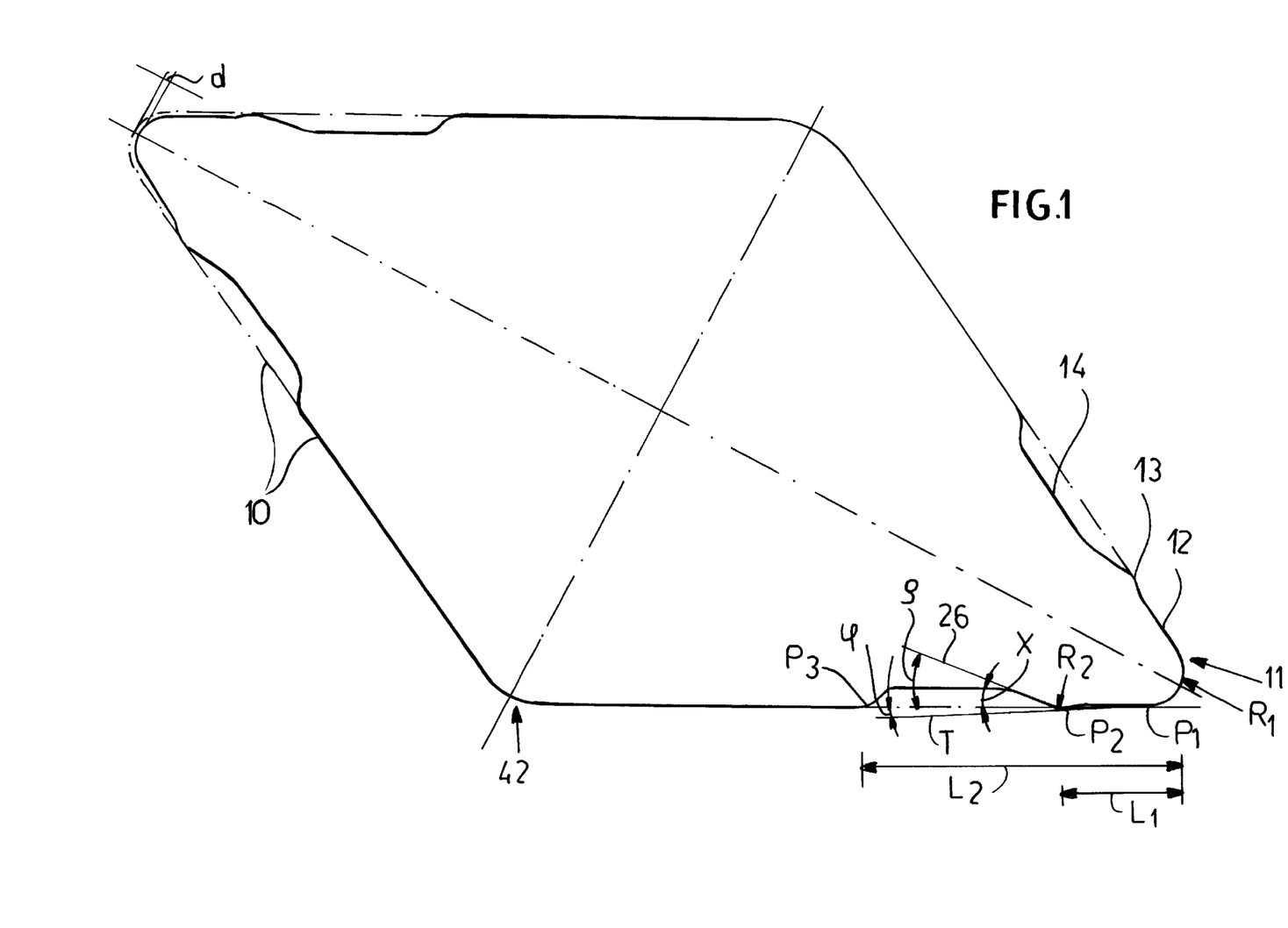
FIG. 1 is a top view of a rhombic indexable cutting plate according to the present invention.
Figure 4:
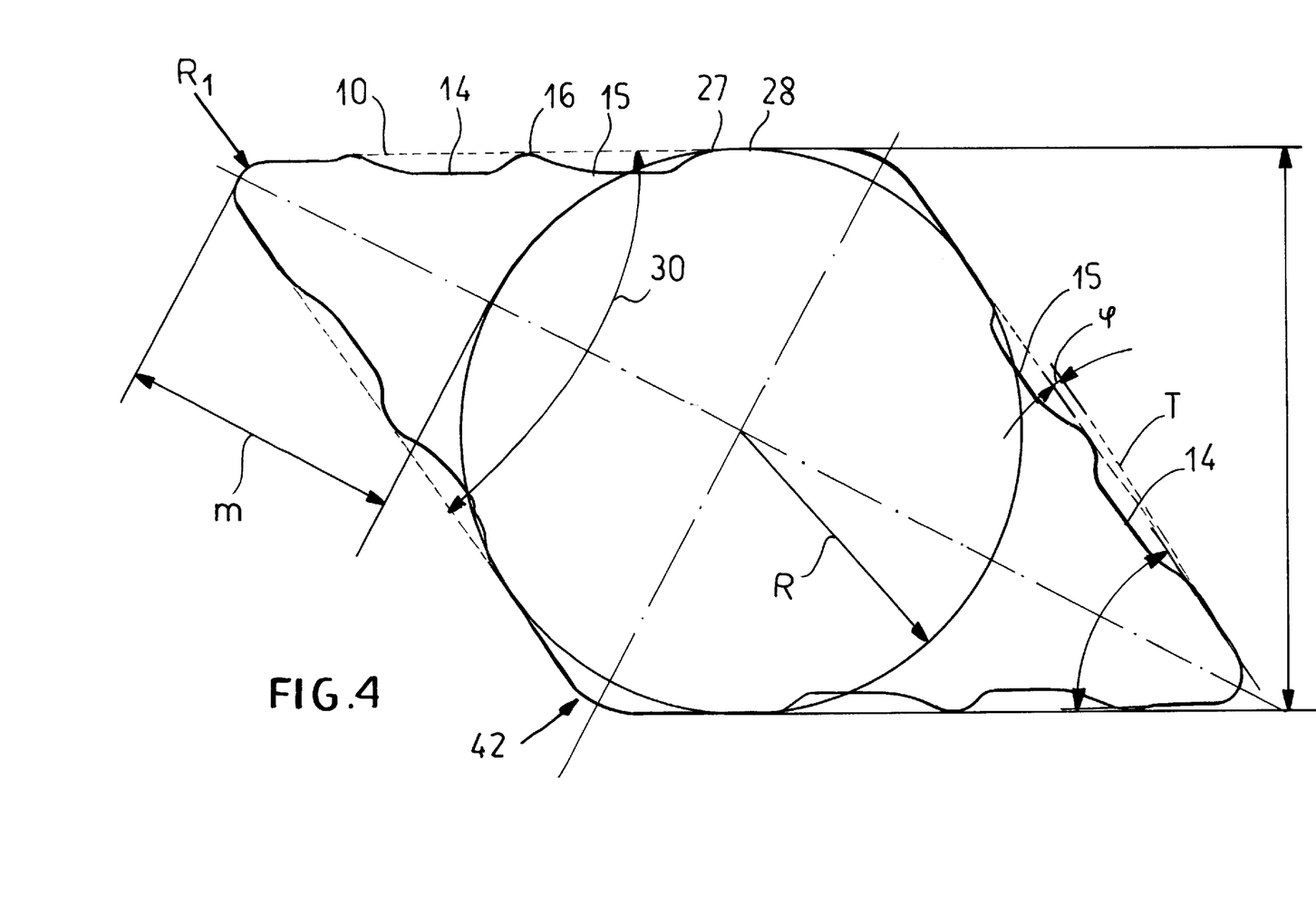
FIG. 4 is a rhombic indexable cutting plate with several cutting recesses.

The embodiment according to FIG. 4 is different from that of FIG. 1 in that several cutting recesses—here an additional cutting recess 15—is provided in addition to the already discussed cutting recess 14. Between the cutting recesses 14 and 15 and projecting outward past them is a cutting region 16 having at least one point in common with the envelope base shape 10. In the illustrated case the region 16 is partly circular but it can also have a straight portion on the base-shape envelope 10. Otherwise the cutting recess 15 is shaped like the cutting recess 14. The corner angle 30 is about 55°.

Figure 5:
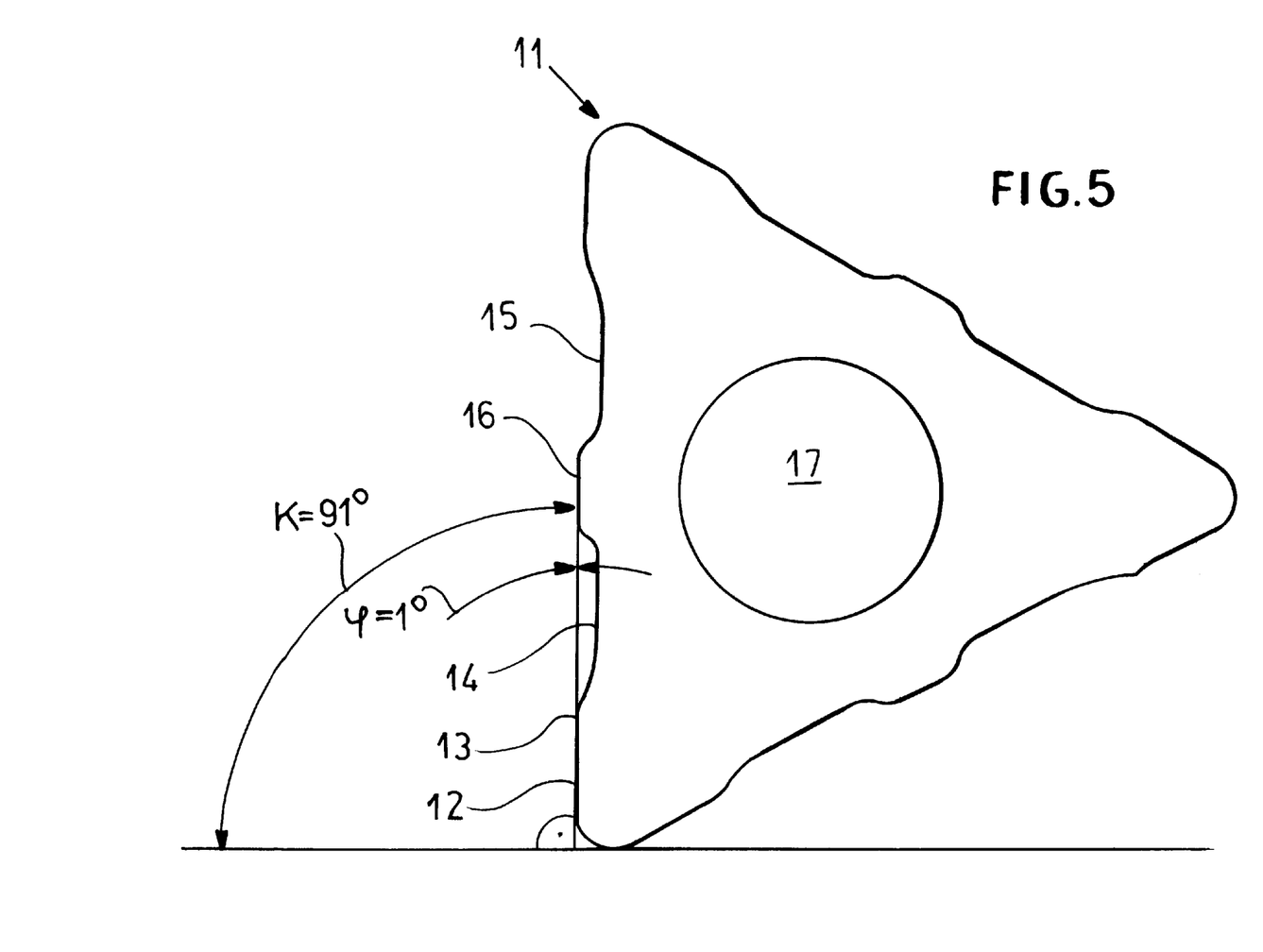
FIG. 5 is a triangular indexable cutting plate according with the present invention in a first embodiment.

FIG. 5 shows a cutting insert with a triangular basic shape where each cutting edge has two succeeding cutting recesses 14 and 15 corresponding to FIG. 4 and the intervening region is partially linear and on the base-shape envelope 10. In this case the angle $\phi=1°$.

Figure 6:
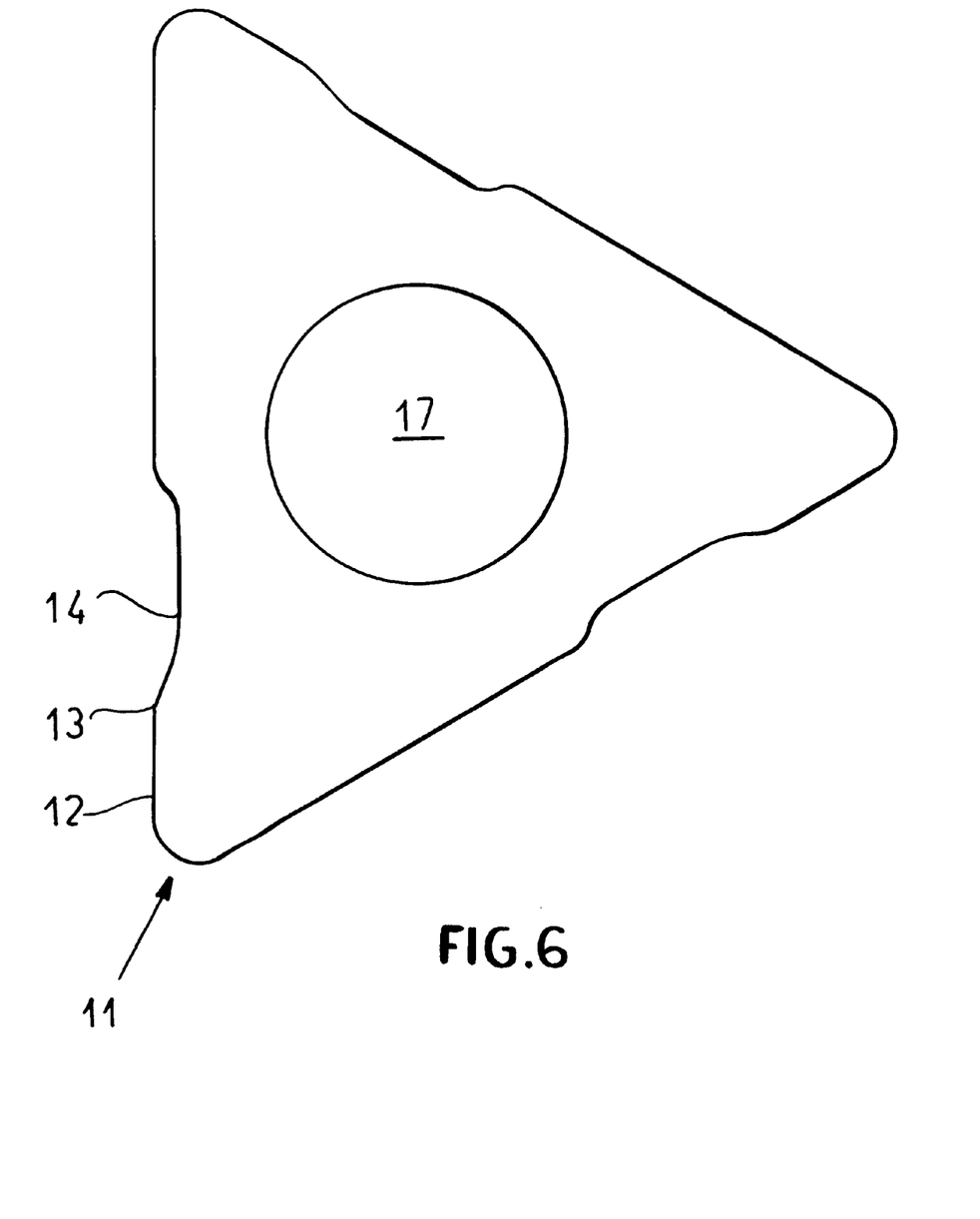
FIG. 6 is a triangular indexable cutting plate in an alternative embodiment.
Figure 7:
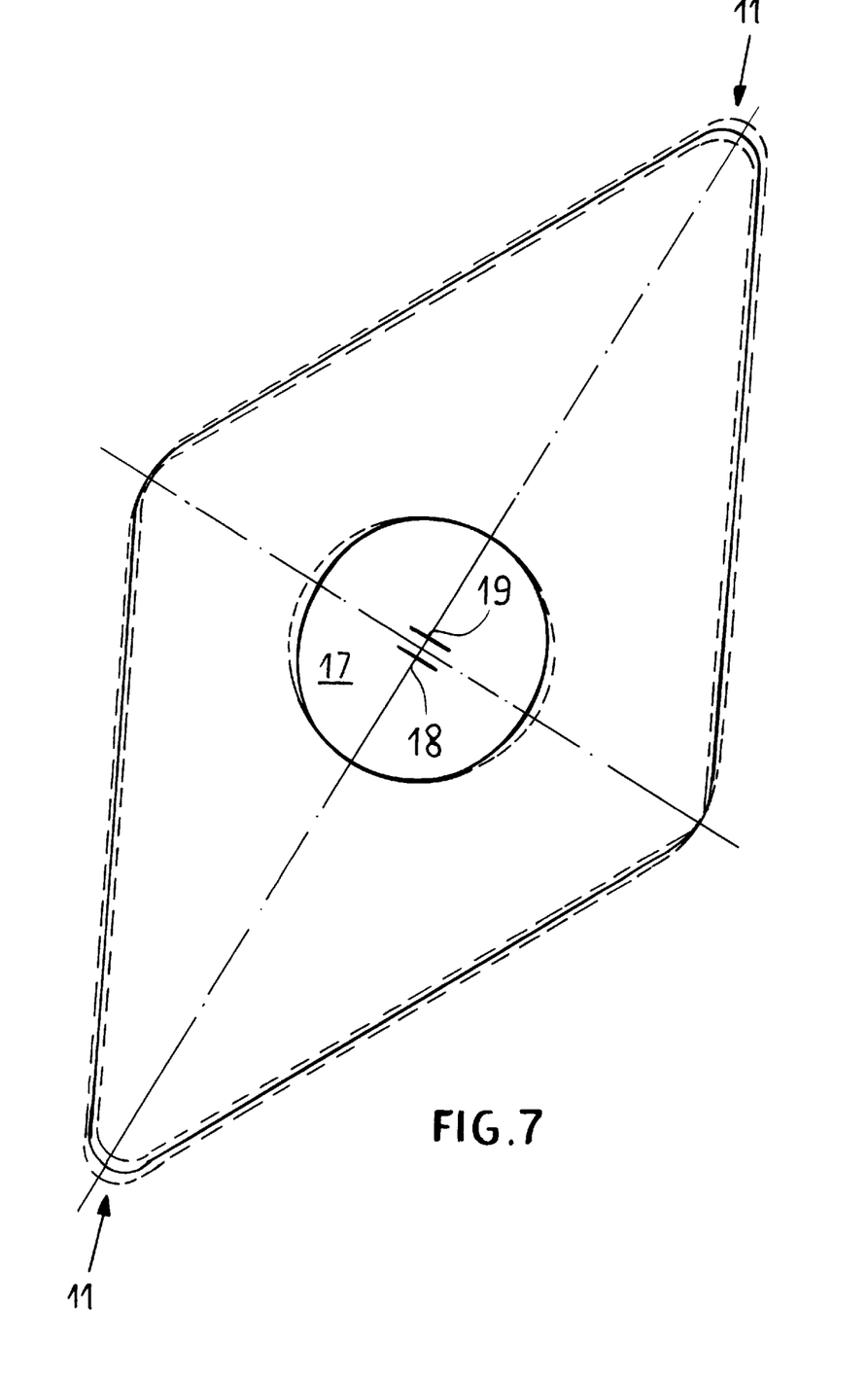
FIG. 7 is a top view of a rhombic indexable cutting plate with an elongated bore.

FIG. 6 shows a triangular cutting-insert shape where only one of the sides defining the main cutting edge of the acute-angle cutting corner has a cutting protuberance and a cutting recess 13, 14. At least on this cutting corner half of the main cutting edge having the recess the cutting corner is set in relative to the envelope. FIG. 7 shows a rhombic cutting-insert plate where relative to the solid line the variation width of the basic rhombic shape is shown. In its center the rhombic cutting plate has a bore 17 which is elongated so that the two center points 18 and 19 are the shifted circle centers of the half-circles which are turned toward the acute-angle cutting corners 11. Instead of the elongated bore one can also provide a circular bore corresponding to the dashed-line size.

Figure 8:
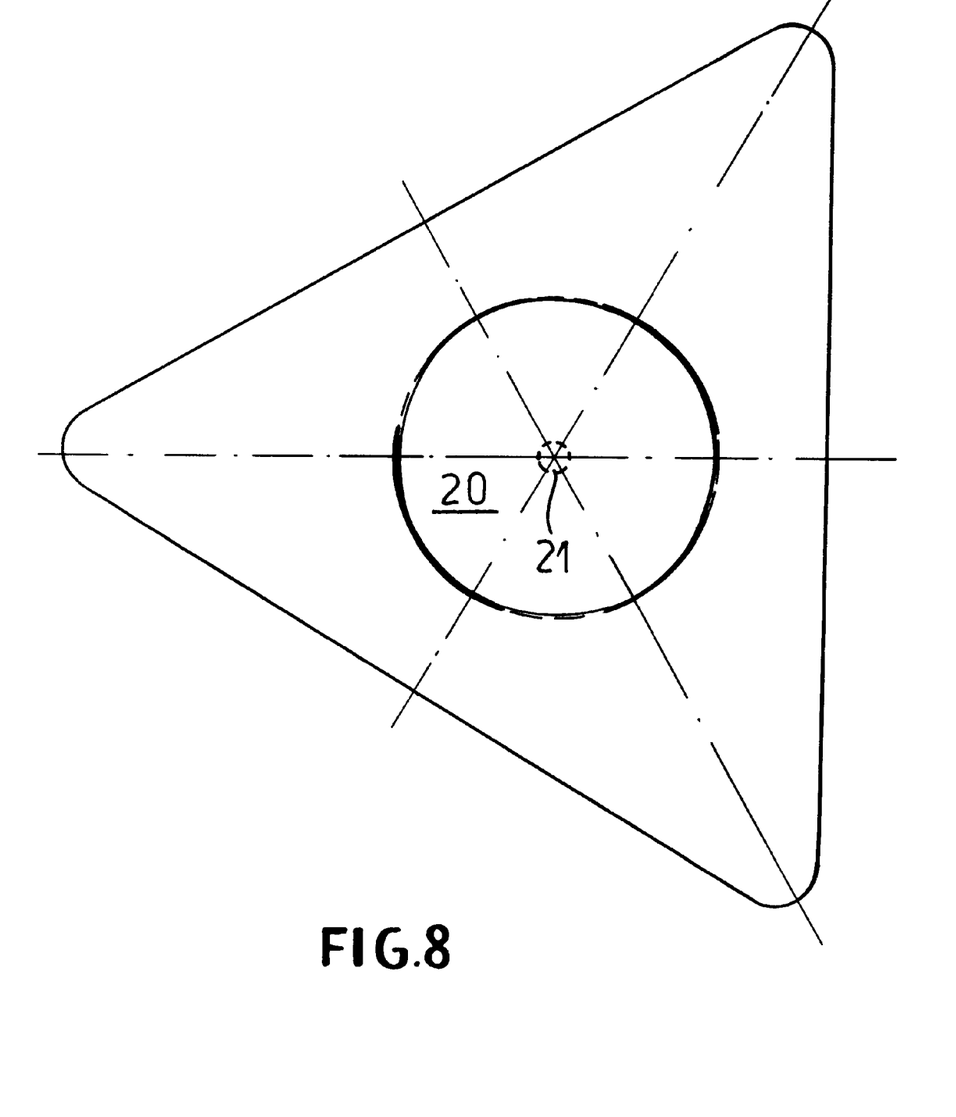
FIG. 8 is a triangular indexable cutting plate with a cloverleaf bore.

In FIG. 8 the bore is cloverleaf-shaped and the inner circle 21 defines with the bisectors the offset circle middle points along which the bores are shifted to the acute-angle cutting corners. Here also instead of the cloverleaf-shaped bore with rounded corners an enlarged bore (shown in dashed shape) can be used.

Figure 9:
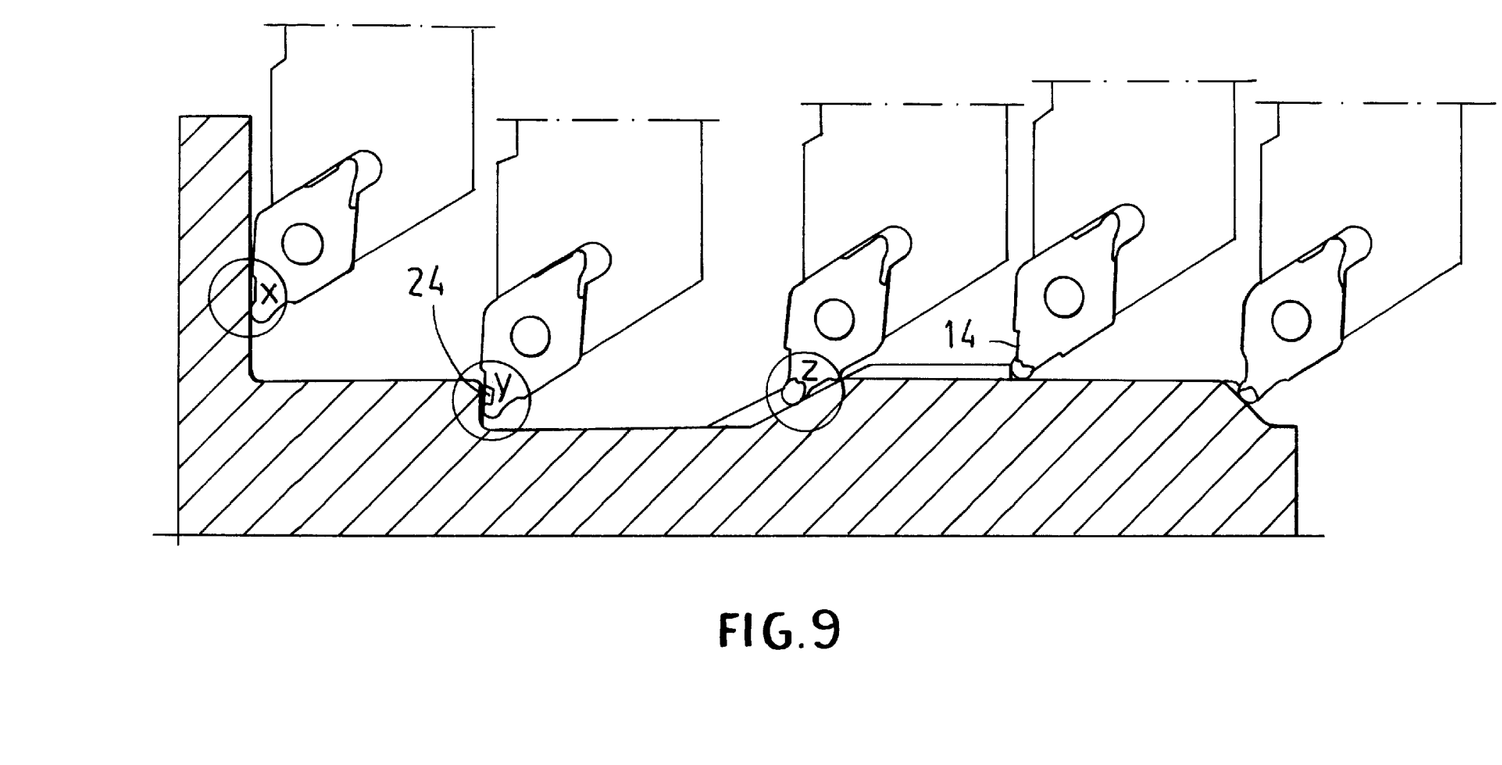
FIG. 9 is a rhombic cutting insert according to FIG. 1 in different machining uses on a workpiece.
Figure 10:
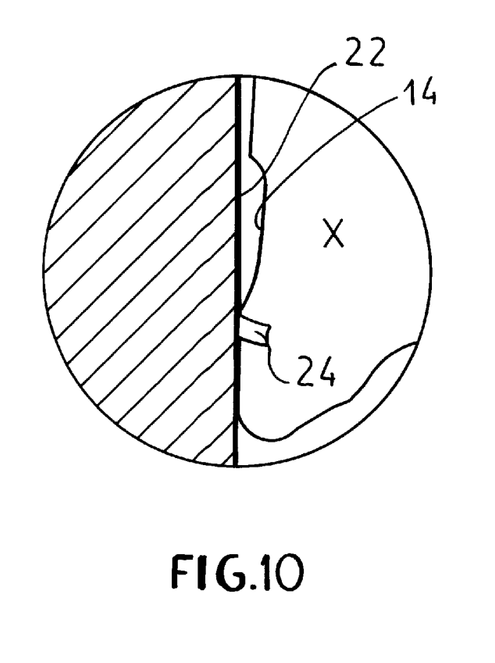
FIGS. 10 through 12 are respective detail views of the machining uses x, y, and z of FIG. 9.
Figure 11:
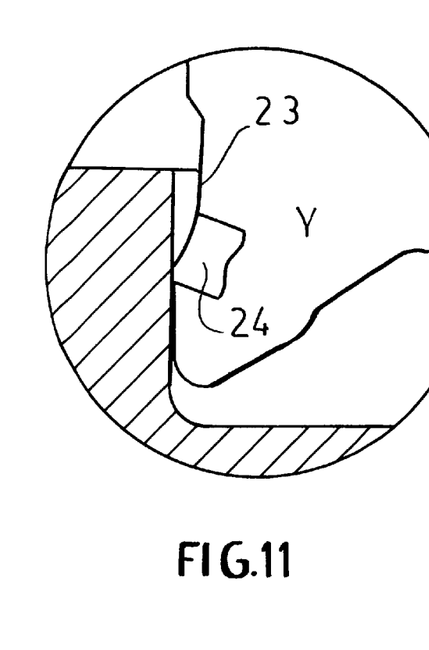
Figure 12:
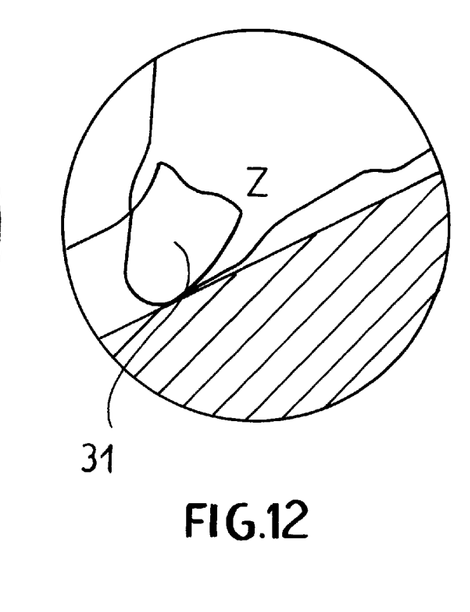

The rhombic cutting insert of FIG. 1 is shown in FIG. 9 in use with x and y each showing respective outward copy-cutting operations of plane workpiece shoulders. According to the cutting depth of the recess 14, shown by the respective removal regions 22 and 23 there are chips 24 of different width. The right half of the view showing operation z, shown in more detail in FIG. 12, is outward copying, cylindrical turning, and inward copying by means of the main cutting edge 12 of the acute-angle cutting corner 11. In this operation the recess 14 does nothing.

Figure 13:
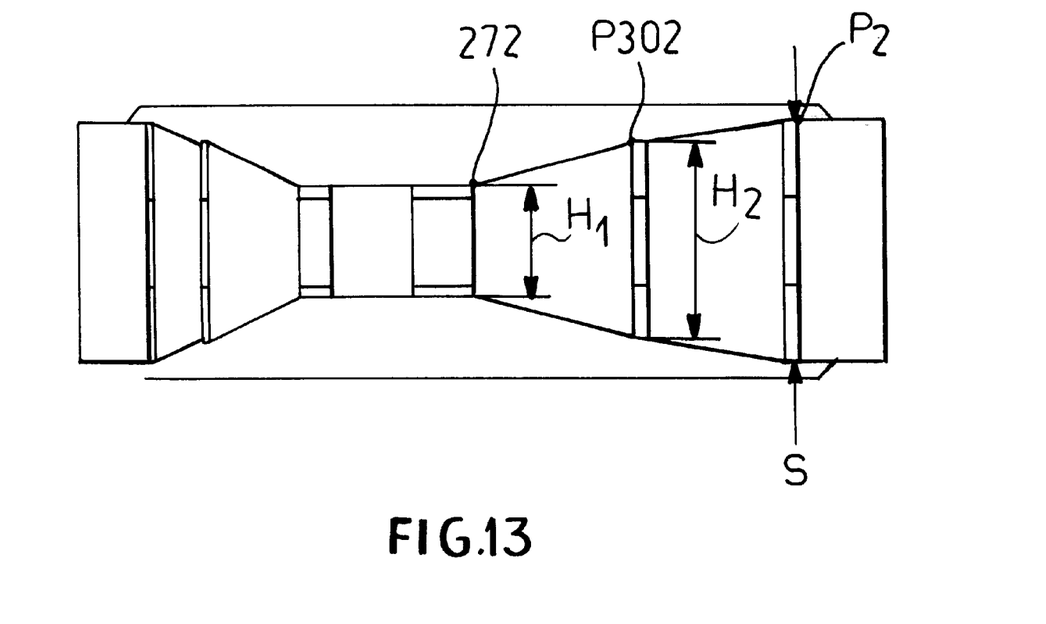
FIGS. 13 and 14 are side views of various embodiments of a rhombic cutting insert corresponding to the view direction B according to FIG. 4.
Figure 14:
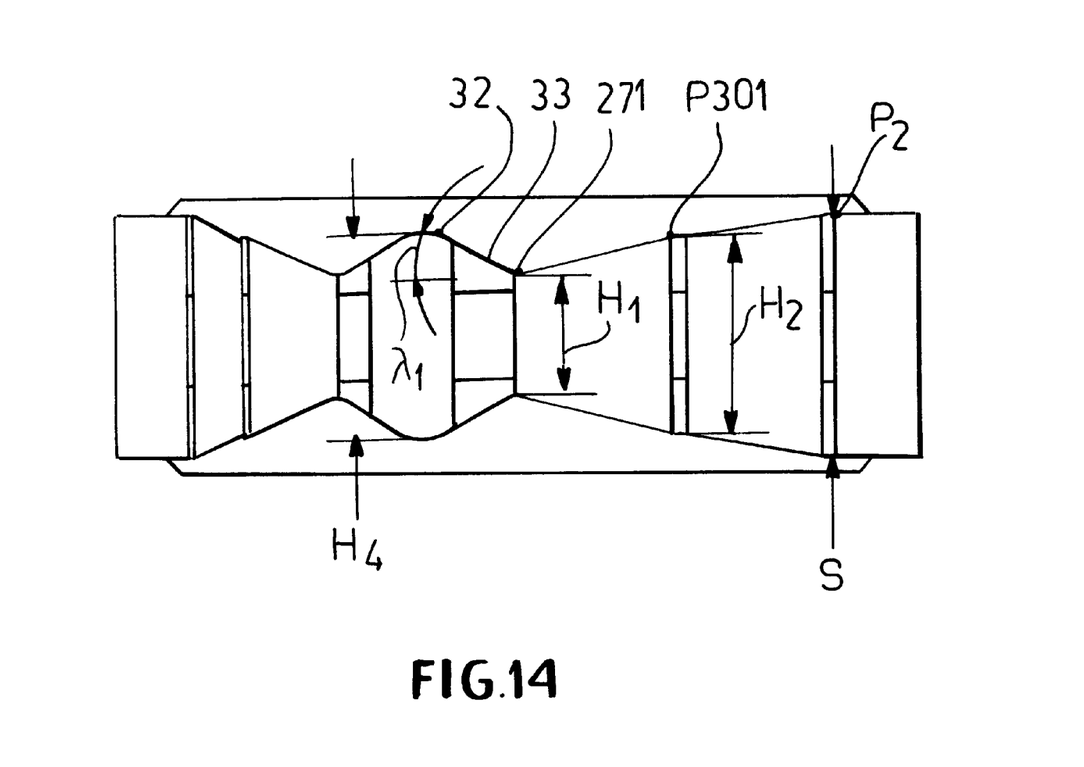

FIGS. 13 and 14, taken in the direction of arrow B of FIG. 4, show side views of an indexable cutting plate 40 which is provided with several recess and which as in FIG. 4 is mounted in a holder 41 and has two sides, that is it is symmetrical to a sectional longitudinal plane. The cutting edge drops stepwise generally from point $P_2$ to the obtuse-angle cutting corner 42 and has a maximum height that is determined by the dimension S. The spacing decreases continuously in the region of the first recess 14 to a spacing H2 after which it remains constant in the region 16 up to the point P302. Starting from the point P302 the height drops to a value H1 so that the cutting edge at the point 272 in the corner region is constant. Correspondingly the described spacings increase to the left of the illustrated cutting corner, that is to the cutting corners 11. The possible effective lateral engagement surface of the indexable cutting plate on the holder are shown black in FIG. 13.

The same is true for FIG. 14 where positions P301 and 271 take the place of the points P302 and 272. In contrast to the embodiment according to FIG. 13 in the embodiment according to FIG. 14 the cutting edge goes up in the region 33 so that the corresponding angle $\lambda_1$ lies between 15° and 45° and is such that the region 33 when the indexable cutting plate is installed in the holder 41 lies in a plane parallel to the plane workpiece shoulder 34 of the workpiece, as shown schematically in FIG. 15. As shown schematically in the blackened surfaces in the region of the obtuse-angle cutting corner 42 of FIG. 14 this substantially increases the effective engagement surface.

Figure 15:
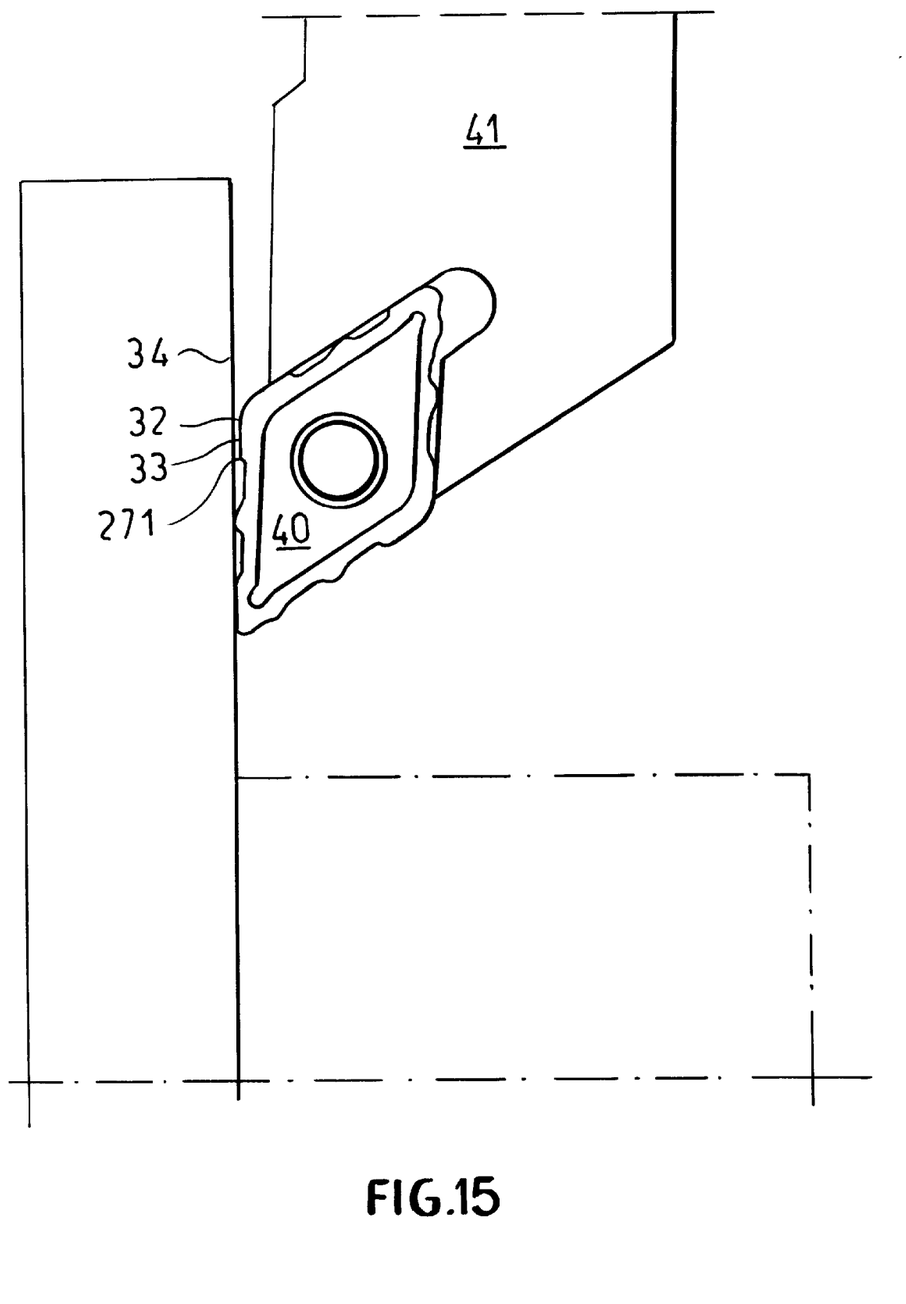
FIG. 15 is a top view of a rhombic cutting insert according to FIG. 4 clamped in a holder on the plane workpiece shoulder of a workpiece.
Figure 16:
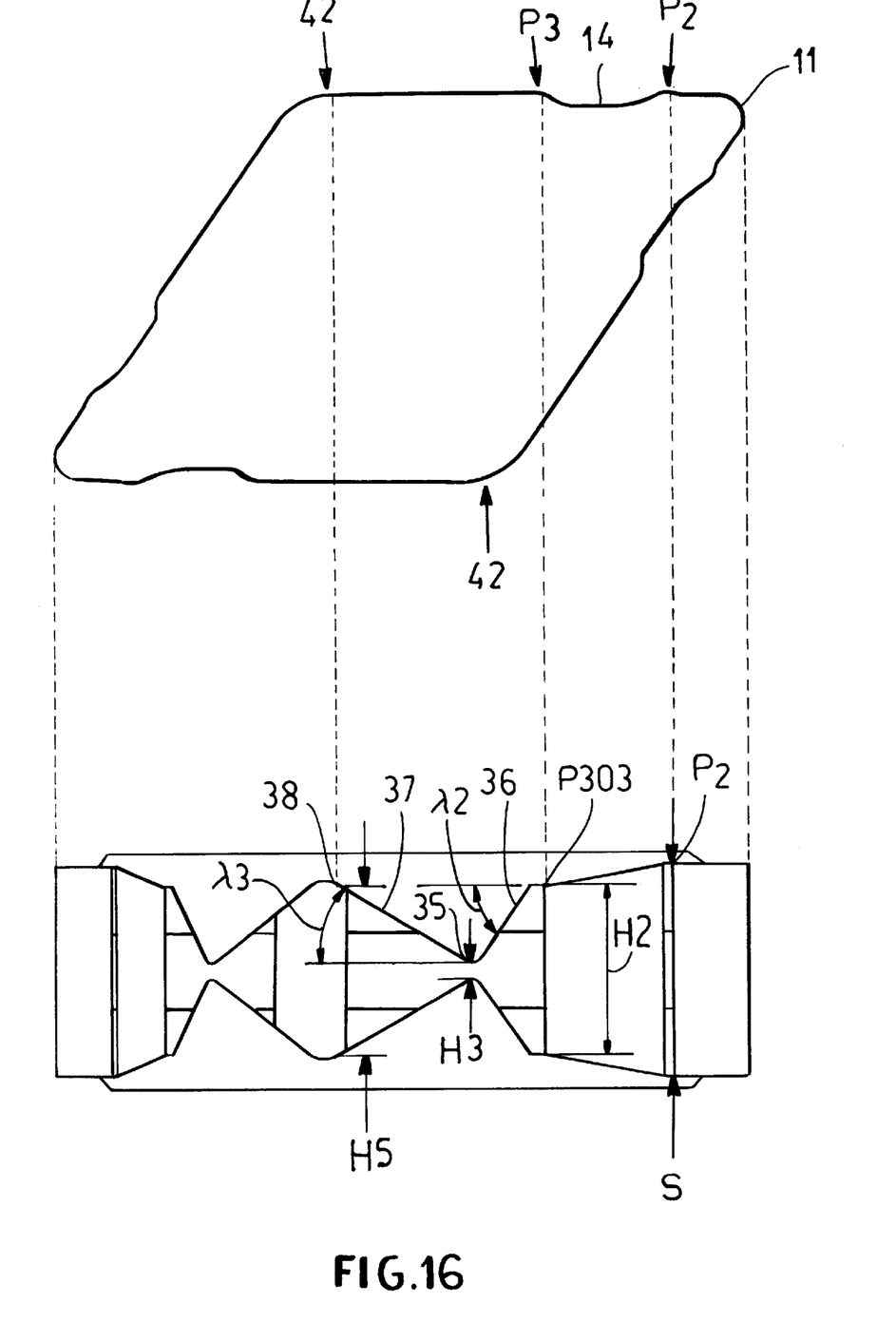
FIG. 16 is a side view of a cutting insert according to FIG. 4 corresponding to view direction A of FIG. 1.

FIG. 16 shows in accordance with the view direction A of FIG. 1 a side view of a rhombic indexable cutting plate with only one recess. The maximum spacing S in this embodiment of the cutting corner remains constant at first up to the sole recess 14 corresponding generally to the point $P_2$ in which region this dimension drops to the height H2. At the point P303 which lies generally at the end of the recess 14 the cutting edge approaches at a strongly positive angle $\lambda_2$ to a point 35 of the adjacent region 36, which can be used for outward planing. In the region of the point 35 the cutting insert has a minimal height H3. The cutting edge rises at regions remote from the cutting edge, namely in the region 37 of the cutting edge up to the point 38, to the obtuse-angle end at a negative angle $\lambda_3$. This angle lies between 15° and 45°. Since the free surface area in the mentioned area lies on the base-shape envelope one gets in comparison to the embodiment according to FIG. 14 between the points P303 and 38 enlarged lateral engagement surfaces illustrated in black. An advantage of the embodiment according FIG. 16 is that during outward plane turning another chip travel direction and chip shape are produced on the blade 36 or on the corresponding cutting-edge region than on the blade in the region of the recess 14, whereby mutual disturbances of chip travel are avoided and good process safety is insured. FIGS. 14 through 16 show at points P301 through P303 the different heights of the points $P_3$.

We claim:
1. A cutting insert for processing a workpiece and having a geometric shape selected from a group consisting of rhomboidal shape, triangular shape and trigonal shape and defining an envelope, said cutting insert comprising:
 a plurality of adjoining edges forming at least one cutting corner therebetween, at least one of the edges running from the cutting corner being a cutting edge formed with
  a respective cutting portion running from the cutting corner and terminating at a distance therefrom,
  at least one curved cutting protuberance adjacent the cutting portion and having an apex projecting outwardly with respect to the cutting portion and lying on the envelope, said one cutting edge having a cutting corner angle less than 90° and being recessed with respect to the envelope to have at least one depression running from the protuberance, so that a common tangent to the cutting portion and the apex of the protuberance forms a first acute angle=k−90°≦20°, whereby k is a set angle during rotation of the workpiece, which is more than 90°.

2. The cutting insert defined in claim 1 wherein another common tangent to a bottom of the depression and the cutting portion forms a second acute angle.

3. The cutting insert defined in claim 1 wherein the tangent between the cutting portion and the apex of the cutting protuberance defines a maximum cutting length for inward or outward copying and cylindrical turning, said one corner being formed with a corner radius smaller than the cylindrical turning.

4. The cutting insert defined in claim 3 wherein the maximum length is 1.5 to 8 times greater than the corner radius.

5. The cutting insert defined in claim 3 wherein the cutting protuberance is formed with a cutting radius which 1.5 to 8 times smaller than the maximum cutting length.

6. The cutting insert defined in claim 1 wherein the cutting portion is a concave portion.

7. The cutting insert defined in claim 1 wherein the cutting portion is a straight-line portion.

8. The cutting insert defined in claim 1 wherein the cutting portion is formed by straight-line-and concave portions.

9. The cutting insert defined in claim 1 wherein the tangent is inclined at angle from 5° to 35° with respect to the envelope.

10. The cutting insert defined in claim 1 wherein the depression has a depth between 0.2 mm and 6 mm.

11. The cutting insert defined in claim 1 wherein a length of the depression is between 2 mm and 10 mm.

12. The cutting insert defined in claim 1 wherein the cutting edge at an end of the depression distant from the cutting protuberance is spaced inwardly from the apex thereof at a distance from 0.3 mm to 2 mm.

13. The cutting insert defined in claim 1 wherein the one corner lies on the envelope.

14. The cutting insert defined in claim 1 further comprising at least one another depression, each of the one and other depressions being defined between respective end points lying in the envelope and thus forming a respective plurality of apexes.

15. The cutting insert defined in claim 1 wherein the cutting portion is 0.1 mm to 1 mm long.

16. The cutting insert defined in claim 1 wherein at least one of opposite ends of the depression lies on the envelope.

17. The cutting insert defined in claim 1 further comprising a central circular cutting-insert bore.

18. The bore defined in claim 17 is circular or oval.

19. The cutting insert define in claim 1 further comprising the one and another opposite cutting edges defining a respective side wall therebetween which bridges opposite land areas terminating in the cutting edges, each of the cutting edges being formed with a respective at least one pair of spaced apart the one depression and another depression, each of the one depressions being formed with a respective bottom extending angularly toward the opposite cutting edge to terminate at a fist distance from each other and each of the other depressions.being formed with a respective bottom extending angularly toward the opposite cutting edge to terminate at a second distance from each other, so that said side wall extended between the cutting corner and an obtuse angle corner is stepped rising toward the corners.

20. The cutting insert defined in claim 19 wherein said first distance is greater than the second distance, each of the cutting edges being further formed with a respective formation defining therebetween a central region of the side wall which extends between the cutting corner and an obtuse angle corner and with another pair of one and other depressions identical to and located symmetrically to the one pair of depressions with respect to the central region, said formations on the opposite cutting edges having respective bottoms facing one another.

21. The cutting insert defined in claim 20 wherein said second distance is $\leq 1$ mm.

22. The cutting insert defined in claim 20 wherein said bottoms of the formations are parallel to each other and spaced at a third distance lesser than the second distance.

23. The cutting insert defined in claim 20 wherein said first distance is up to 1.2 times said second distance.

24. The cutting insert defined in claim 20 wherein said bottoms of the formations are curved in opposite directions thus determining a fourth distance therebetween at least as great as the second distance.

25. The cutting insert defined in claim 19 wherein the cutting edge rises to the obtuse-angel corner at a negative angle.

26. The cutting insert defined in claim 25 wherein the negative angle is 15° to 45°.

27. The cutting insert defined in claim 19 wherein said cutting edge raises toward the cutting corner at a positive angle lying between 30° and 75°.

28. The cutting insert defined in claim 19 is mounted on an insert holder at an attack level lying between 90° and 107.5°.

* * * * *